United States Patent [19]

Kimura et al.

[11] Patent Number: 5,017,523

[45] Date of Patent: May 21, 1991

[54] METHOD FOR THE PREPARATION OF ULTRA-FINE HOLLOW GLASS SPHERES

[75] Inventors: Kunio Kimura; Kazuhiko Jinnai; Hiroshi Tateyama, all of Tosu, Japan

[73] Assignee: Japan as represented by Director General of Agency of Industrial Science and Technology, Tokyo, Japan

[21] Appl. No.: 491,427

[22] Filed: Mar. 9, 1990

[30] Foreign Application Priority Data

May 9, 1989 [JP] Japan .................................. 1-116662

[51] Int. Cl.$^5$ ...................... C04B 38/00; C04B 38/02; C03B 19/10; C03C 17/00
[52] U.S. Cl. ........................................ 501/85; 501/80; 501/84; 65/214; 65/31; 106/605
[58] Field of Search ...................... 501/64, 84, 32, 80, 501/85; 106/280, 401, 409, 75, 122; 65/21.4, 22, 30.1, 30.12, 31, 301

[56] References Cited

U.S. PATENT DOCUMENTS 3,061,495 10/1962 Alford .................................. 156/25
3,281,225 10/1966 Hazdra et al. ........................ 65/30
3,711,263 1/1973 Leger ................................... 65/31
3,752,685 3/1971 Honda et al. ................... 106/288 B
4,107,388 8/1978 Gambaretto et al. .............. 428/428
4,343,675 8/1982 Anderson et al. .................. 156/628

*Primary Examiner*—William R. Dixon, Jr.
*Assistant Examiner*—Michael Marcheschi
*Attorney, Agent, or Firm*—Wenderoth, Lind & Ponack

[57] ABSTRACT

Ultra-fine hollow glass spheres suitable as a filler in light-weight composite materials for building use and the like can be prepared from a fine powder of volcanic glass even when the starting powder has a particle size as fine as 20 $\mu$m or smaller. The inventive method comprises an acid-leaching treatment of the starting powder using hydrochloric or sulfuric acid under hydrothermal conditions at 150°–200° C. to modify the chemical composition in the surface layer of the particles and a subsequent heat treatment of the acid-treated particles at a specified high temperature to effect expansion by the water vapor produced from the structural water in the softened particles. By virtue of the modified composition in the surface layer and in contrast to the prior art method without the acid treatment, a good balance can be obtained between the rate of water vapor release and softening of the particles even when the particle size is extremely small to facilitate expansion of the particles.

2 Claims, No Drawings

METHOD FOR THE PREPARATION OF ULTRA-FINE HOLLOW GLASS SPHERES

BACKGROUND OF THE INVENTION

The present invention relates to a novel method for the preparation of ultra-fine hollow glass spheres, which can be used, for example, as a filler of various kinds of lightweight composite materials from volcanic glass in the pyroclastic deposit, which is simply referred to as volcanic glass hereinafter.

It is a known technology as disclosed, for example, in Japanese Patent Publication 48-17645 and U.S. Pat. Nos. 3,752,685 and No. 3,904,377 that fine hollow glass spheres are prepared from a naturally occurring powdery volcanic glass by a heat treatment to cause expansion of the particles as a result of simultaneous gas evolution and softening of the particles. This prior art method has a limitation in the applicability in respect of the fineness in the particle size of the powdery starting material to be subjected to the heat treatment of the method. Namely, no ultra-fine hollow glass spheres can be obtained by this prior art method even by starting from a very finely pulverized material having a particle size of, for example, 20 $\mu$m or smaller due to premature dissipation of the gas or water vapor before full softening of the particles.

SUMMARY OF THE INVENTION

The present invention accordingly has an object to provide a novel and improved method for the preparation of ultra-fine hollow glass spheres having such an extremely small particle size not obtained by the prior art method from volcanic glass as the starting material.

Thus, the method of the invention for the preparation of ultra-fine hollow glass spheres comprises the successive steps of:

(a) heating particles of powdery volcanic glass having a particle size, for example, not exceeding 20 $\mu$m in an aqueous solution of hydrochloric acid or sulfuric acid in a concentration in the range from about 0.5 to about 10% by weight at a temperature in the range, preferably, from 150° to 200° C. for a length of time in the range, for example, from 8 hours to 120 hours;

(b) washing the acid-treated particles with water and drying; and (c) heating the acid-treated and washed and dried particles at a temperature in the range from 900° to 1100° C. for a length of time in the range from 1 second to 60 seconds.

DETAILED DESCRIPTION OF THE PREFERRED EMBODIMENTS

As is described above, the essential steps in the inventive method include the steps (a), (b) and (c), of which the step (a) is for an acid leaching treatment of a finely pulverized volcanic glass powder as the starting material and the step (c) is for the expansion treatment of the thus acid-treated particles at high temperatures.

The starting material used in the inventive method is a powder of volcanic glass occurring in volcanic districts. Although chemical compositions of volcanic glass may be widely varied from volcano to volcano, the method of the present invention is applicable to those of which the principal chemical constituents are silica and alumina provided that the volcanic glass has an amorphous structure as examined by the powder X-ray diffractometry in the range of $2\theta = 20$–$30°$ by using the Cu-K$\alpha$ line. A suitable example of such a powder of volcanic glass is a pyroclastic deposit occurring in Kagoshima Prefecture, Japan, called Yoshida Shirasu. Typically, Yoshida Shirasu contains the inorganic constituents including: 70.54% of $SiO_2$; 13.10% of $Al_2O_3$; 1.82% of $Fe_2O_3$; 0.53% of CaO; 0.48% of MgO, 3.60% of $Na_2O$; 2.90% of $K_2O$; and 6.05% of loss on ignition, which is mostly water as a constituent of the glassy structure.

Since such volcanic glass contains a considerable amount of water as is mentioned above, it is known that, when a powder of the volcanic glass is heated at a temperature at which the glassy structure of the particles is softened and simultaneously the water contained in the glassy structure is released in the form of water vapor, the glassy particles are expanded by the water vapor. A heat treatment of such a starting glassy material in a powdery form accordingly causes expansion of the individual particles to give hollow glass spheres. When the particle size of the starting glassy particles is too fine, however, desired hollow glass spheres can hardly be obtained by the heat treatment due to loss of balance between softening of the particles and evolution of the water vapor which is dissipated too rapidly by diffusion out of the particles before the particles is imparted with softness suitable for expansion. This is the reason for the limitation in the applicability of the prior art method in this principle when ultra-fine hollow glass spheres are desired.

Accordingly, the inventors have conducted extensive investigations to develop a method for the preparation of ultra-fine hollow glass spheres from volcanic glass even when an extremely fine particle size not obtained in the prior art method is desired. As a result, it has been unexpectedly discovered that even very fine particles of the volcanic glass can be expanded satisfactorily to give ultra-fine hollow glass spheres when the starting particles are subjected to an acid-leaching treatment prior to expansion by a heat treatment at high temperatures leading to completion of the present invention.

Namely, the method of the present invention is most advantageously applicable to particles of volcanic glass when the particles have a size not exceeding 20 $\mu$m though not particularly limitative thereto. When the volcanic glass found in nature is not in such a finely particulate form, it is desirable that the powder as obtained is pulverized to have such a fine particle size distribution. It is also desirable that the starting powdery material, either as obtained or after pulverization, is subjected to a treatment for particle size classification, for example, by elutriation in order that the particles subjected to the inventive method may have a relatively uniform particle size distribution which is a desirable condition to ensure uniformity in the ultra-fine hollow glass spheres as the product. The inventive method is applicable to any fine particles but it is preferable that the glassy powder subjected to the acid treatment in step (a) has a particle size distribution in the range from about 1 $\mu$m to about 20 $\mu$m.

The fine particles of the volcanic glass are then subjected to a treatment of acid leaching in step (a). Thus, the particles are immersed in an aqueous acid solution and heated therein so that some of the chemical constituents in the surface layer of the particles are leached out in the acid solution to give a chemical composition of the surface layer different from that in the core portion. The acid used in step (a) is an inorganic strong acid such as hydrochloric and sulfuric acids though not particularly limitative thereto. The concentration of the acid in the aqueous acid solution is preferably in the range from 0.5 to 10% by weight for hydrochloric and sulfuric acids. The amount of the aqueous acid solution should of course be large enough so that the particles immersed therein are completely covered by the solution although an excessively large amount of the acid solution is undesirable for the economical reason. For example, the amount of the aqueous acid solution is preferably in the range from 1.5 to 10 kg/kg of the powdery starting material.

The temperature at which the treatment of acid leaching is conducted should be 100° C. or higher or, preferably, in the range from 150° C. to 200° C. so that the acid treatment is performed in a pressurizable vessel, i.e. autoclave, under the so-called hydrothermal conditions. An excessively long time would be taken for the acid treatment when the temperature is too low. In this regard, an excessively high temperature of the treatment is undesirable because the vessel must be pressure-resistant so much. It has been unexpectedly discovered that such a hydrothermal treatment not only has an effect of accelerating the process of the treatment of acid leaching from the surface layer of the particles but also has an effect to increase the water content in the structure of the particles so that the efficiency of expansion in step (c) is greatly improved. The chemical constituents leached out from the surface layer of the particles are mainly iron and alkali metal constituents and such an alteration in the chemical composition of the surface layer has an effect to retard the diffusion of water vapor through the surface layer so that a good balance is obtained between the velocities of water vapor dissipation and softening of the glassy particles to ensure good expansion of the particles in step (c) along with an effect of prevention of agglomeration of particles or adhesion of the particles to the furnace walls at high temperatures. It is of course that a decrease in the content of ferrous constituents in the surface layer results in a decreased coloration of the particles after expansion so that the ultra fine hollow glass spheres prepared according to the inventive method are imparted with an increased whiteness. The treatment of acid leaching in step (a) is performed for a length of time of at least 8 hours or, preferably, in the rangr from 8 hours to 120 hours though heavily dependent on various parameters such as the particle size, concentration of the acid, treatment temperature and the like. When the length of time for the acid treatment is too short, the desired effect of acid leaching from the surface layer cannot be obtained as a matter of course. On the other hand, an acid treatment for an excessively long time is also undesirable, especially, when the starting glassy particles have an extremely small particle size, for example, smaller than 1 μm in diameter.

The particles of the volcanic glass after the acid treatment in the above described manner are then freed from the acid solution by a suitable means such as filtration, centrifugal separation, decantation and the like and washed with water to neutrality and dried in air.

The thus obtained dry particles after the acid treatment are then subjected to a heat treatment for expansion in step (c). The temperature suitable for expansion of the particles is in the range from 900° C. to 1100° C. and the particles are kept for 1 second to 60 seconds in this temperature range depending on the particle size of the powder. It is important that the temperature of the particles is increased from room temperature at a rate as large as possible so as to reach the above mentioned temperature range within a relatively short time. It is usual according to the inventive method that the particles are expanded by up to about 400% in the apparent volume to give a yield higher than 50% by weight of the fully expanded particles having having an apparent density not exceeding 1 g/cm$^3$.

To summarize, the method of the present invention provides a possibility of preparing ultra-fine hollow glass spheres so fine as not to be prepared in the prior art method and having increased whiteness without the troubles of agglomeration of the particles or adhesion of the particles to the furnace walls.

it is sometImes desirable that the thus expanded hollow glass spheres are subjected to classification relative to the apparent density of the particles by a suitable method such as sink-float separation in water or an appropriate liquid medium of a desired specific gravity or air elutriation to remove particles of low expansion because the degree of expansion of the particles cannot be very uniform.

In the following, the method of the invention is described in more detail by way of examples.

EXAMPLE 1

Yoshida Shirasu, a volcanic glass powder described above, was subjected to pulverization in a porcelain-made pot mill for 8 hours and then subjected to particle size classification by elutriation to give two fractions having particle size ditributions, one, in the range from 5 to 10 μm and, the other, in the range from 10 to 20 μm.

Particles of each of the finer and coarser fractions were immersed in a 2% by weight aqueous solution of hydrochloric acid in an amount of 10 times by weight and heated in a Teflon-lined autoclave at 200° C. for 120 hours. After cooling, the powder was taken out and filtered, washed with water and dried. The loss on ignition of the thus surface-treated powders was increased from 6.05% by weight before the treatment to 10.05% in the finer fraction and to 9.50% in the coarser fraction after the autoclave treatment.

Each a 100 g portion of the thus acid-treated and washed and dried powders was subjected to a heat treatment in a furnace by freely dropping the particles in a vertically held furnace tube of 600 mm long according to such an estimated schedule of temperature elevation that the temperature of the particles was increased from room temperature to 1000° C. within 60 seconds and then kept at 1000° C. for a few seconds to several tens of seconds to effect expansion of the particles followed by cooling to room temperature. The expanded particles were subjected to sink-float separation in water and the fraction floating on water was collected as the product of ultra-fine hollow glass spheres. The thus expanded particles had a particle diameter distributions of 5 to 15 μm and 10 to 30 μm from the finer and coarser fractions, respectively, of the starting powder. The yields of the products were 16.9 g and 30.0 g from the finer and coarser fractions, respectively.

The yield of the product was unchanged even by extending the length of time over 60 seconds for keeping the particles at 1000 ° C. The yield was also unchanged when the temperature for the expansion treatment of the acid-treated particles was increased to 1100° C. under otherwise the same conditions as above although the temperature could not be increased above 1100° C. because of the eventual adhesion of the particles to the furnace walls and agglomeration of particles. On the other hand, the yield of the product spheres was decreased when the temperature for the expansion treatment was decreased below 1000° C. and no expanded particles floating on water could be obtained when the temperature was 900° C. or lower.

For comparison, the same procedures as above were repeated excepting omission of the step of the autoclave treatment of the powder in the acis solution to give only 2 g or less of the expanded particles floating on water in the sink-float separation from each of the finer and coarser fractions irrespective of the conditions.

EXAMPLE 2

The experimental procedure was substantially the same as in the first described experiment in Example 1 using the finer fraction of the starting powder, i.e. having a particle size distribution of 5 to 10 μm except that sulfuric acid, in addition to hydrochloric acid, was used as the acid for the acid treatment and the concentration of the acid in the aqueous acid solution was varied within a range up to 10% by weight. As a control, the same autoclave treatment was undertaken by using unacidified neutral water as the medium of the hydrothermal treatment. The yields in g of the product hollow spheres floating on water were as shown in Table 1 below. It is understood from the table that the yield is optimum with hydrochloric acid when the acid concentration is in the range from 1 to 5% and the yield with sulfuric acid is increased as the acid concentration is increased but levels off at about 5% of the concentration.

TABLE 1

| Acid | Acid concentration, % | | | | | |
|---|---|---|---|---|---|---|
| | 0 | 0.5 | 1 | 2 | 5 | 10 |
| Hydrochloric | 4.7 | 9.1 | 15.7 | 16.9 | 16.6 | 12.9 |
| Sulfuric | 4.7 | 6.0 | 7.0 | 10.1 | 12.4 | 12.2 |

EXAMPLE 3

The experimental procedure was substantially the same as in Example 1 using the finer fraction of the starting powder, i.e. having a particle size distribution of 5 to 10 μm, except that the amount of the aqueous acid solution for the acid treatment was varied from 1.5 times to 10 times by weight of the amount of the powder under treatment. The yields of the product of hollow glass spheres floating on water were 9.7 g, 14.4 g and 16.9 g when the amount of the aqueous acid solution was 1.5 times, 4 times and 10 times, respectively, by weight of the treated powder. It is apparent that an increase in the amount of the aqueous acid solution has an advantageous effect on the yield of the product of glass spheres although the yield would level off when the amount is increased over 10 times by weight

EXAMPLE 4

The experimental procedure was substantially the same as in the first experiment in Example 1 using the finer fraction of the starting powder, i.e. having a particle size distribution of 5 to 10 μm, except that the length of time for the autoclave treatment was varied in the range from 8 hours to 120 hours. The yields of the product of hollow glass spheres floating on water were 3.5 g, 6.6 g, 9.4 g and 16.9 g when the length of time of the autoclaving was 8 hours, 24 hours, 48 hours and 120 hours, respectively, the yield being less than 2 g when no acid treatment was undertaken. It would be a fair assumption from these results that the yield could still be improved by extending the length of the acid treatment time over 120 hours.

EXAMPLE 5

The experimental procedure was substantially the same as in the first experiment in Example 1 using the finer fraction of the starting powder, i.e. having a particle size distribution of 5 to 10 μm, except that the temperature for the autoclave treatment was varied in the range from 150° C. to 200° C. The yields of the product of hollow glass spheres floating on water were 5.6 g, 11.6 g and 16.9 g when the temperature was 150° C., 180° C. or 200° C., respectively, indicating that the yield of the product could be improved by increasing the temperature in the acid treatment.

What is claimed is:

1. A method for the preparation of ultra-fine hollow glass spheres from a powder of volcanic glass which comprises the successive steps of:
   (a) heating particles of volcanic glass not exceeding 20 μm in an aqueous solution of hydrochloric acid or sulfuric acid in a concentration in the range from 0.5 to 10% by weight at a temperature in the range from 150° to 200° C. for a length of time of at least 8 hours;
   (b) washing the acid-treated particles with water and drying; and
   (c) heating the acid-treated and washed and dried particles at a temperature in the range from 900° to 1100° C. for a length of time in the range from 1 to 60 seconds.

2. The method for the preparation of ultra-fine hollow glass spheres from a powder of volcanic glass as claimed in claim 1 wherein the amount of the aqueous acid solution is at least 1.5 times by weight of the powder of volcanic glass.

* * * * *